(12) United States Patent  
Kumar

(10) Patent No.: US 8,467,910 B1
(45) Date of Patent: Jun. 18, 2013

(54) ENERGY CONSERVATION TECHNIQUES, METHODOLOGY AND SYSTEM FOR WATER HEATING APPLICATIONS

(76) Inventor: Sivathanu B. Kumar, Tampa, FL (US)

( * ) Notice: Subject to any disclaimer, the term of this patent is extended or adjusted under 35 U.S.C. 154(b) by 383 days.

(21) Appl. No.: 12/802,792

(22) Filed: Jun. 14, 2010

Related U.S. Application Data

(60) Provisional application No. 61/268,696, filed on Jun. 15, 2009, provisional application No. 61/270,061, filed on Jul. 3, 2009, provisional application No. 61/271,402, filed on Jul. 21, 2009.

(51) Int. Cl.
*G05D 17/02* (2006.01)

(52) U.S. Cl.
USPC .......................................................... 700/291

(58) Field of Classification Search
USPC ................................................. 700/16, 291
See application file for complete search history.

(56) References Cited

U.S. PATENT DOCUMENTS

| | | | | |
|---|---|---|---|---|
| 5,429,186 | A * | 7/1995 | Kurz et al. | 165/157 |
| 7,164,851 | B2 * | 1/2007 | Sturm et al. | 392/463 |
| 7,620,302 | B2 * | 11/2009 | Lesage et al. | 392/454 |
| 7,934,662 | B1 * | 5/2011 | Jenkins | 236/12.1 |
| 2004/0042772 | A1 * | 3/2004 | Whitford et al. | 392/498 |
| 2008/0205865 | A1 * | 8/2008 | Lesage et al. | 392/454 |
| 2009/0211567 | A1 * | 8/2009 | Thomasson | 126/585 |
| 2009/0214195 | A1 * | 8/2009 | Thomasson | 392/451 |
| 2011/0073190 | A1 * | 3/2011 | Peteri | 137/1 |

* cited by examiner

*Primary Examiner* — Dave Robertson

(57) ABSTRACT

A container has at least an inlet line, an outlet line, an associated heating element, and within the container a primary temperature sensor. A full year clock/calendar generator component determines the temperature of liquids and continuous time of the day and time of the year at the location of the system. A central processing unit, power supply having computer hardware and software with at least program means, memory, programs, storage input and output means operatively coupled to the heating element, the primary temperature sensor, and the clock/calendar generator component is adapted to activate, inactivate and control the heating element as a function of the central processing unit utilizing data from the clock/calendar generator component and the temperature sensor.

1 Claim, 12 Drawing Sheets

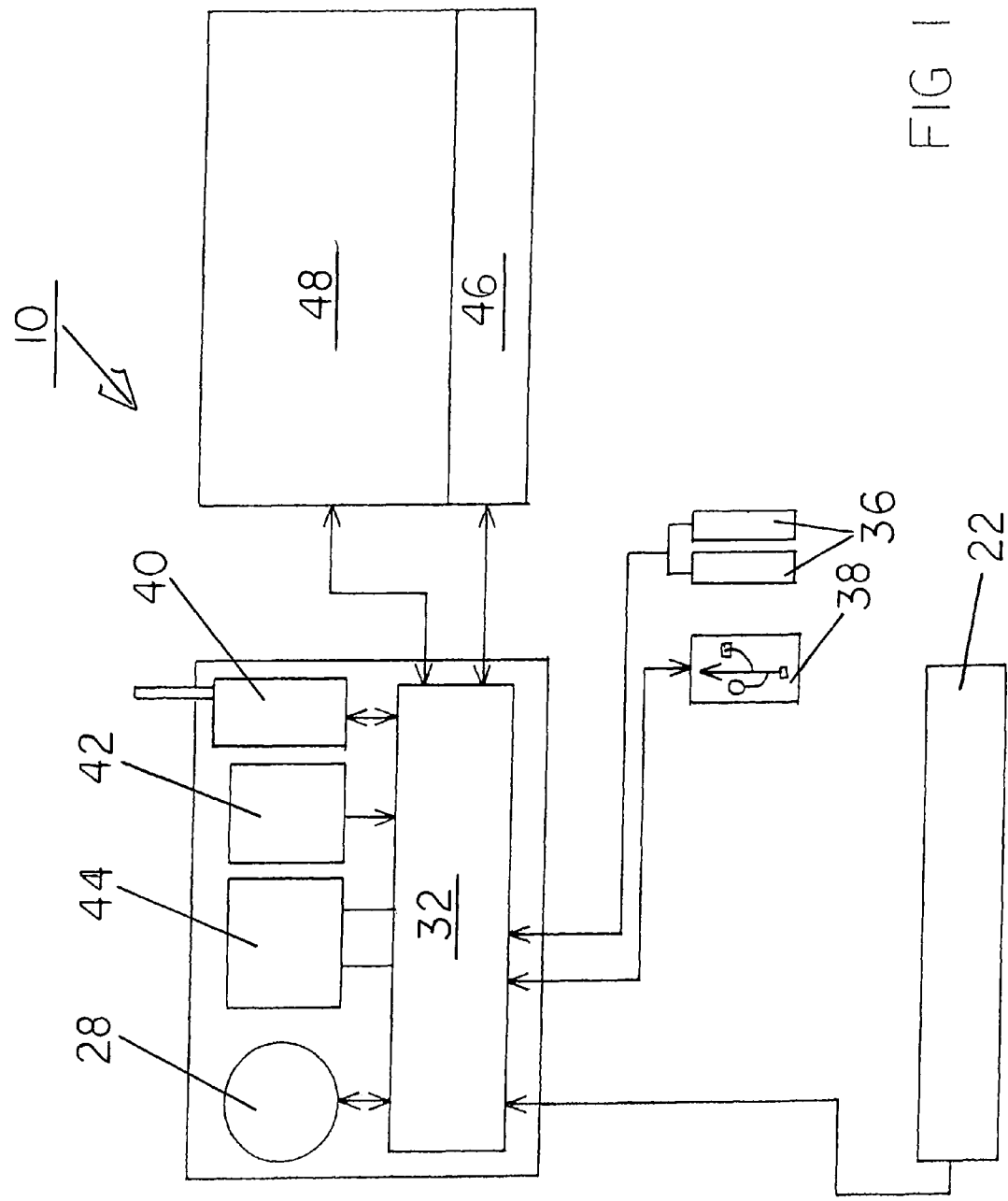

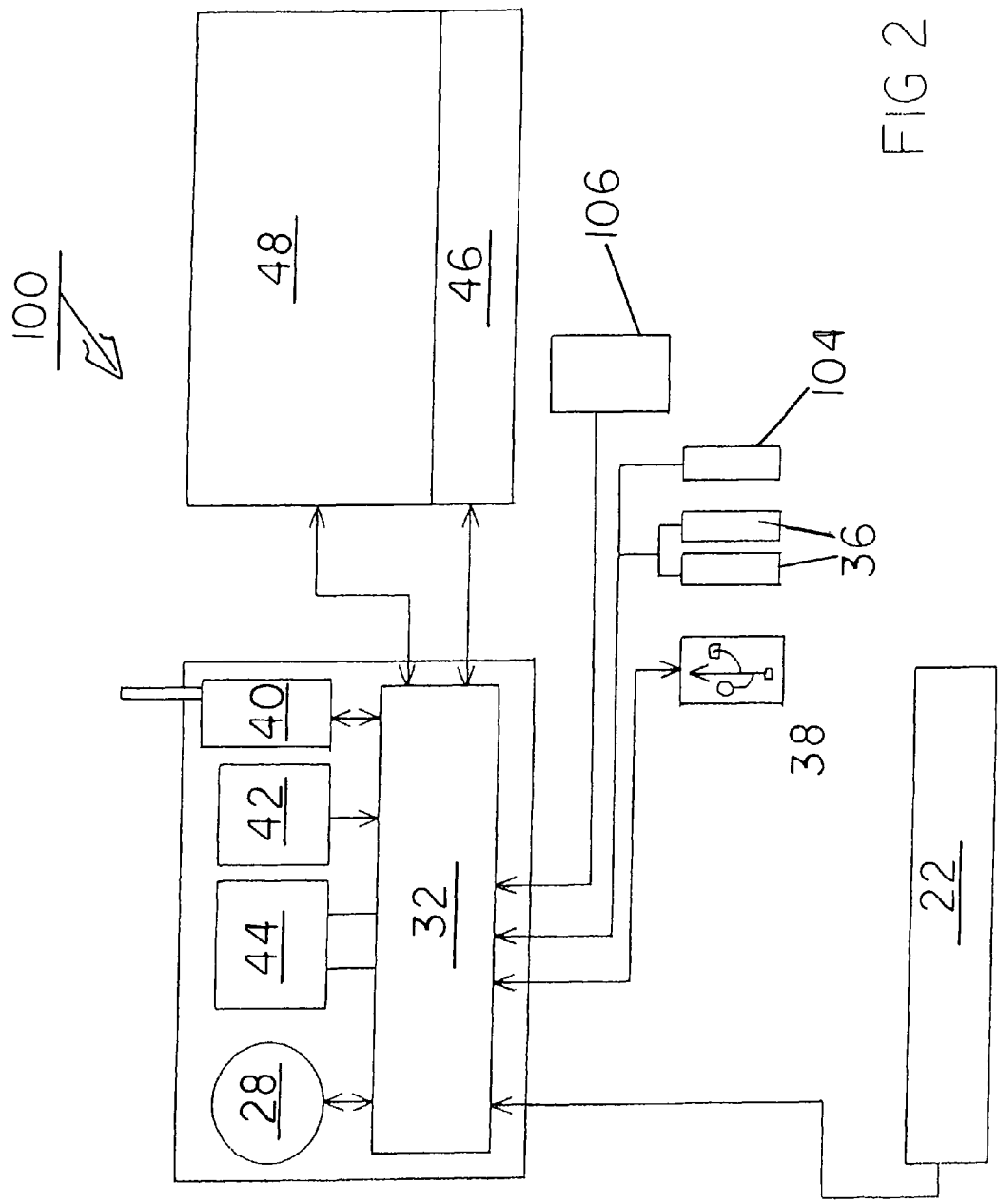

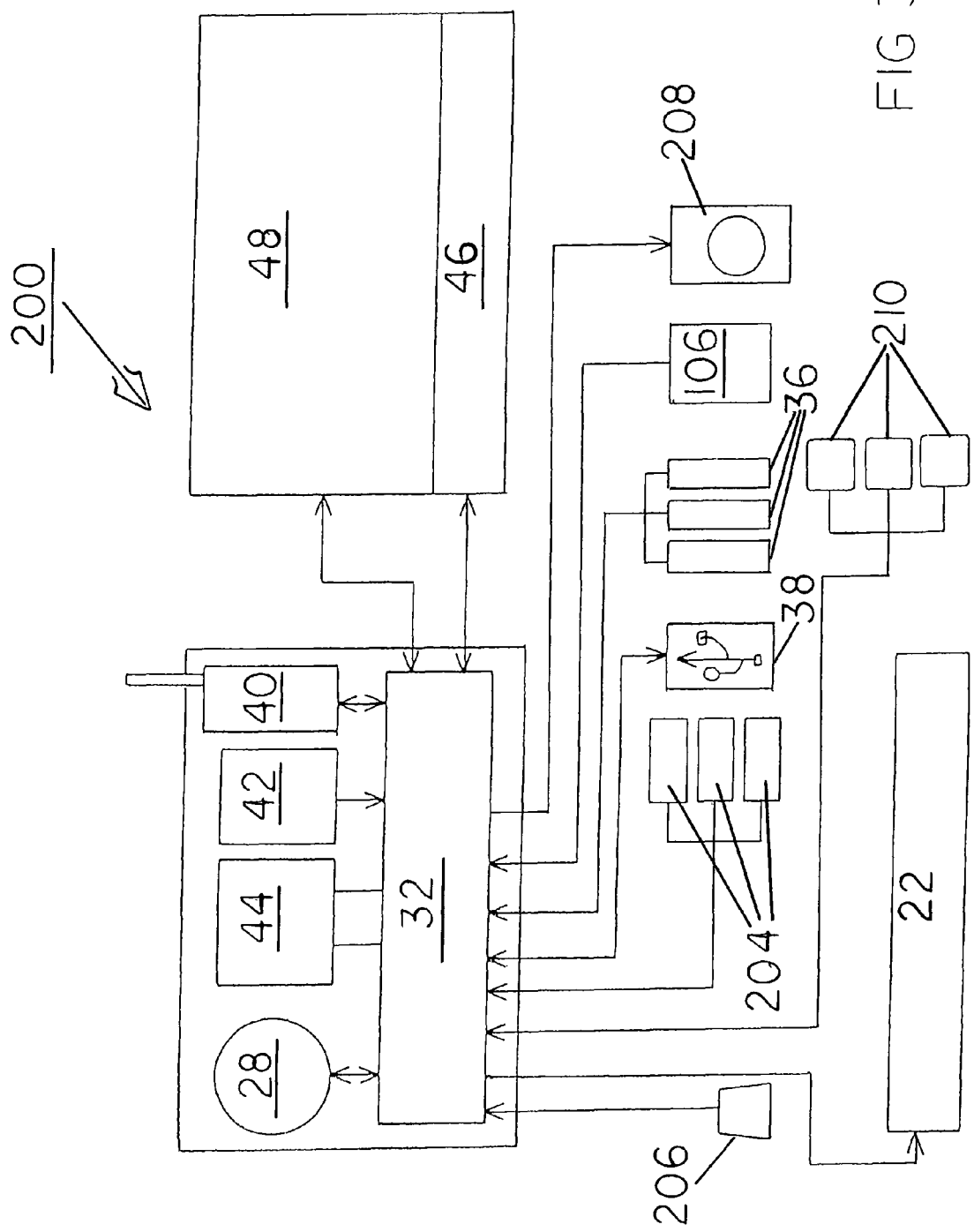

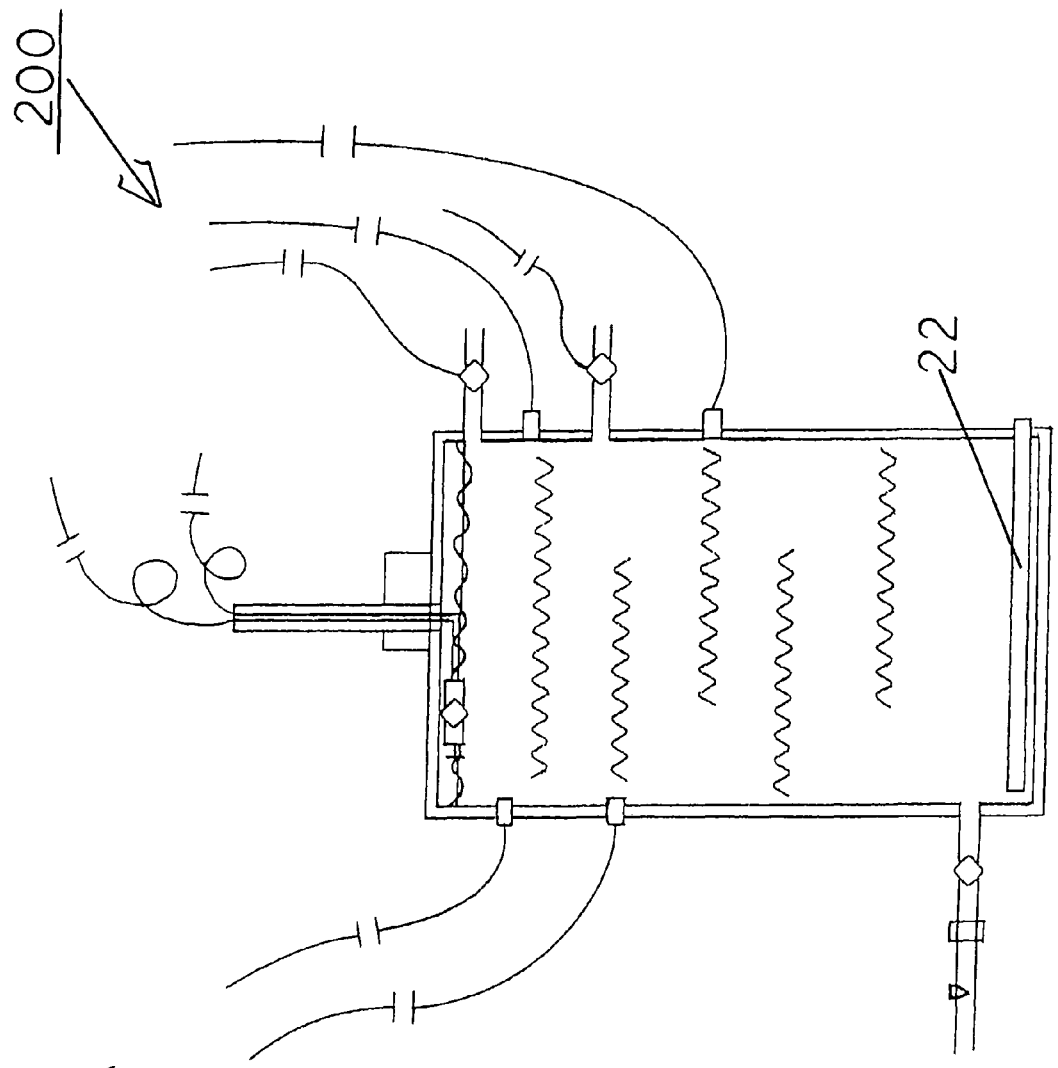

ENERGY CONSERVATION TECHNIQUES, METHODOLOGY AND SYSTEM FOR WATER HEATING APPLICATIONS

RELATED APPLICATION

The present non-provisional patent application is based upon applicant Sivathanu B. Kumar's Provisional Application No. 61/268,696 filed Jun. 15, 2009, entitled Programmable Temperature Control Device; Provisional Application No. 61/270,061 filed Jul. 3, 2009 entitled Programmable Temperature Control Device; and Provisional Application Number 61,271,402 filed Jul. 21, 2009 entitled "Programmable Temperature Control Device, Part III, the subject matter of which applications is incorporated herein by reference.

BACKGROUND OF THE INVENTION

1. Field of the Invention

The present invention relates to a programmable temperature control device and more particularly pertains to reducing and conserving energy and fuel consumption of appliances used for heating and maintaining the temperature of liquid/water, such as water heaters, boilers and the like.

2. Description of the Prior Art

The use of programmable thermostats of known designs and configurations is known in the prior art. More specifically, programmable thermostats of known designs and configurations previously devised and utilized for the purpose of reducing energy consumption are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a programmable temperature control device that allows reducing and conserving energy and fuel consumption of appliances used for heating and maintaining the temperature of liquid/water, such as water heaters, boilers and the like.

In this respect, the programmable temperature control device according to the present invention substantially departs from the conventional concepts and designs of the prior art, and in doing so provides an apparatus primarily developed for the purpose of reducing and conserving energy and fuel consumption of appliances used for heating and maintaining the temperature of liquid/water, such as water heaters, boilers and the like.

Therefore, it can be appreciated that there exists a continuing need for a new and improved programmable temperature control device which can be used for reducing and conserving energy and fuel consumption of appliances used for heating and maintaining the temperature of liquid/water, such as water heaters, boilers and the like. In this regard, the present invention substantially fulfills this need.

SUMMARY OF THE INVENTION

In view of the foregoing disadvantages inherent in the known types of programmable thermostats of known designs and configurations now present in the prior art, the present invention provides an improved programmable temperature control device. As such, the general purpose of the present invention, which will be described subsequently in greater detail, is to provide a new and improved programmable temperature control device and method which has all the advantages of the prior art and none of the disadvantages.

To attain this, the present invention essentially comprises a liquid heater control system having a container with an inlet line and an outlet line. A heating element is located in association with the container. A primary temperature sensor is located within the container. A full year clock/calendar generator component is provided for determining the temperature of liquids and continuous time of the day and time of the year at the location of the system.

Next provided is a central processing unit/power supply operatively coupled to the heating element and to the primary temperature sensor and to the clock/calendar generator component. The central processing unit is adapted to activate, inactivate and control the heating element as a function of data from the clock/calendar generator component and the temperature sensor.

Operatively coupled to the central processing unit, power supply are a secondary temperature sensor and a USB port and a receiver for remote control and an auxiliary power supply and a memory programmer. The central processing unit has an associated data input means and display screen. In this manner while in Function 1, Mode 1, the operator is enabled to set and select water temperatures and monitor water at lower temperatures than during warmer months. In this mode, the temperature sensors of a water heater can be used for this function and the thermostat of the water heater is either replaced by a central processing unit and alternatively used along with the thermostat of the water heater.

Further included and operatively coupled to the central processing unit, power supply, are a supplemental temperature sensor and a flow meter. In this manner, while in Function 1, Mode 2, secondary temperature sensors sense the temperature of an exterior water source and correct to the appropriate temperature.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved programmable temperature control device which has all of the advantages of the prior art programmable thermostats of known designs and configurations and none of the disadvantages.

It is another object of the present invention to provide a new and improved programmable temperature control device which may be easily and efficiently manufactured and marketed.

It is further object of the present invention to provide a new and improved programmable temperature control device which is of durable and reliable constructions.

An even further object of the present invention is to provide a new and improved programmable temperature control device which is susceptible of a low cost of manufacture with regard to both materials and labor, and which accordingly is then susceptible of low prices of sale to the consuming public, thereby making such programmable temperature control device economically available to the buying public.

Even still another object of the present invention is to provide a programmable temperature control device for reducing and conserving energy and fuel consumption of appliances used for heating and maintaining the temperature of liquid/water, such as water heaters, boilers and the like.

Lastly, it is an object of the present invention to provide a new and improved programmable temperature control device having a container with an inlet line, an outlet line, an associated heating element, and within the container a primary temperature sensor. A full year clock/calendar generator component determines the temperature of liquids and continuous time of the day and time of the year at the location of the system. A central processing unit, power supply having computer hardware and software with at least program means, memory, programs, storage input and output means operatively coupled to the heating element, the primary temperature sensor, and the clock/calendar generator component is adapted to activate, inactivate and control the heating element as a function of the central processing unit utilizing data from the clock/calendar generator component and the temperature sensor.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic illustration of a liquid heater control system constructed and configured for operation in a first mode/function.

FIG. 2 is a schematic illustration similar to FIG. 1 but configured for operation in a second mode/function.

FIGS. 3, 3A, 3B and 3C are schematic and elevational views mode/function.

The same reference numerals refer to the same parts throughout the various Figures.

DESCRIPTION OF THE PREFERRED EMBODIMENT

Figure 1A:
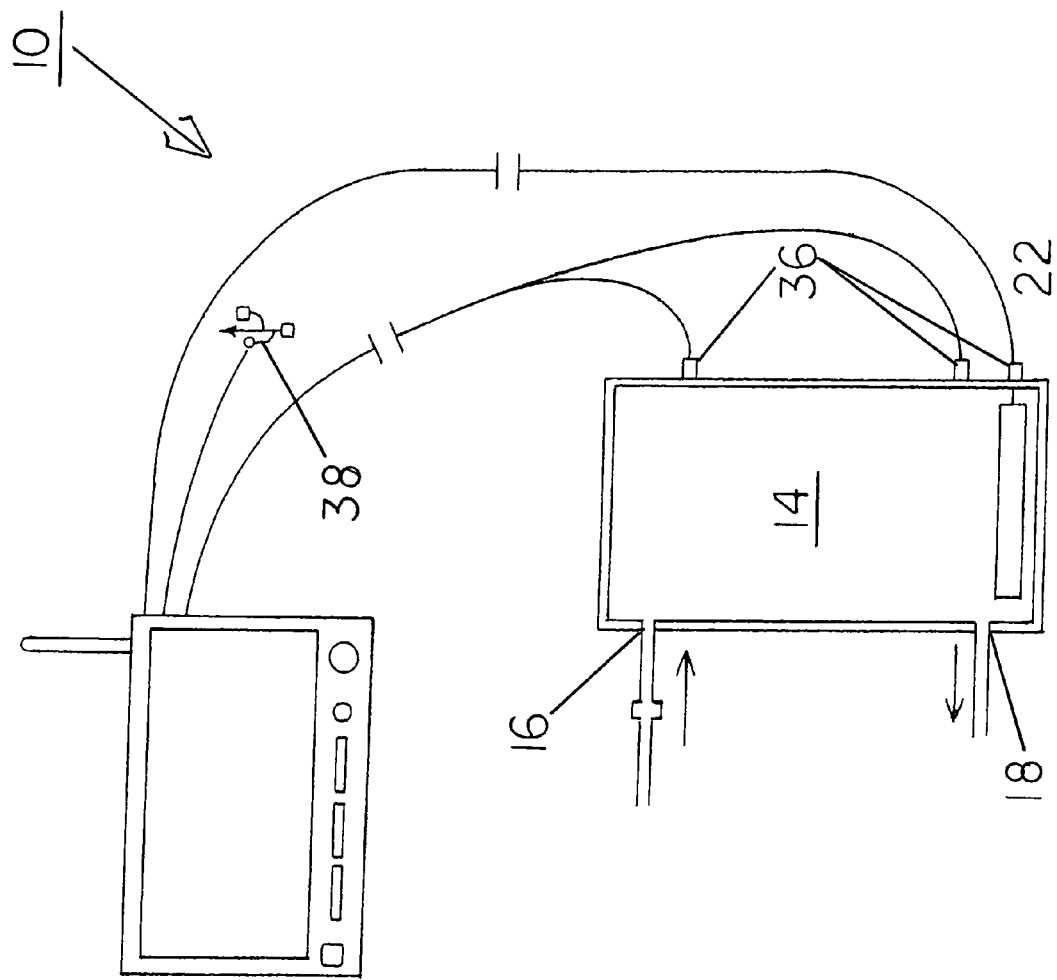
FIG. 1A is a front elevational view of the container and the display screen/data input means illustrated in FIG. 1.

With reference now to the drawings, and in particular to FIG. 1 thereof, the preferred embodiment of the new and improved programmable temperature control device embodying the principles and concepts of the present invention and generally designated by the reference numeral 10 will be described.

The present invention, the programmable temperature control device 10 is comprised of a plurality of components. Such components in their broadest context include a container, a heating element, a primary temperature sensor, a full year clock/calendar generator component, and a central processing unit/power supply. Such components are individually configured and correlated with respect to each other so as to attain the desired objective.

The liquid heater control system 10 of the present invention has a container 14 with an inlet line 16 and an outlet line 18. A heating element 22 is located in association with the container. A primary temperature sensor 24 is located within the container. A full year clock/calendar generator component 28 is provided for determining the temperature of liquids and continuous time of the day and time of the year at the location of the system.

Next provided is a central processing unit/power supply 32. The central processing unit/power supply is operatively coupled to [a.] the heating element and to [b.] the primary temperature sensor and to [c.] the clock/calendar generator component. The central processing unit is adapted to activate, inactivate and control the heating element as a function of data from the clock/calendar generator component and the temperature sensor.

Operatively coupled to the central processing unit, power supply are a [d.] secondary temperature sensor 36 and a [e.] USB port 38 and a [f.] receiver 40 for remote control and an [g.] auxiliary power supply 42 and [h.] a memory programmer 44. The central processing unit has an associated data input means 46 and display screen 48. Reference is now made to FIGS. 1 and 1A. In this manner while in Function 1, Mode 1, the operator is enabled to set and select water temperatures and monitor water at lower temperatures than during warmer months. In this mode, the temperature sensors of a water heater can be used for this function and the thermostat of the water heater is either replaced by a central processing unit and alternatively used along with the thermostat of the water heater.

Figure 2A:
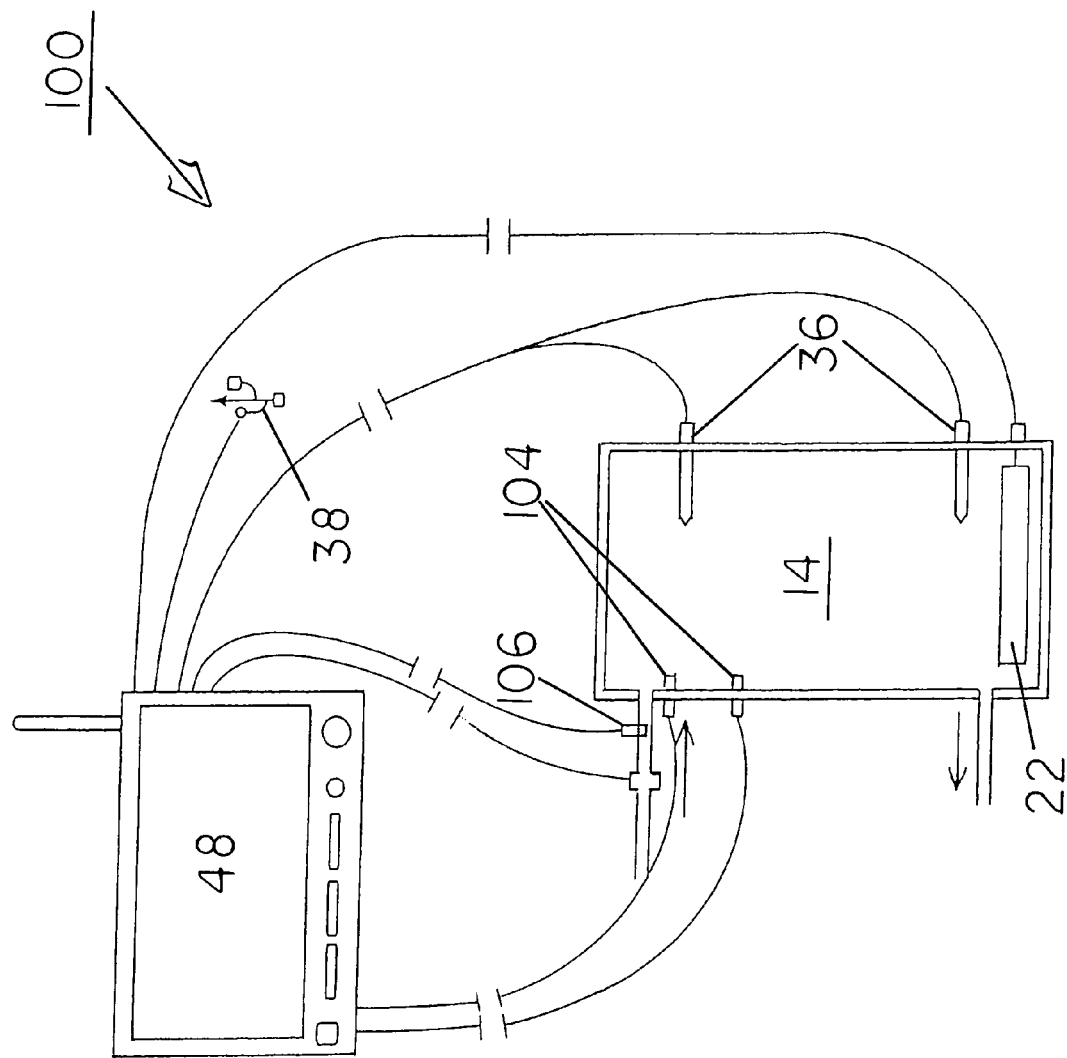
FIG. 2A is a front elevational view of the container and the display screen/data input means illustrated in FIG. 2.
Figure 3B:
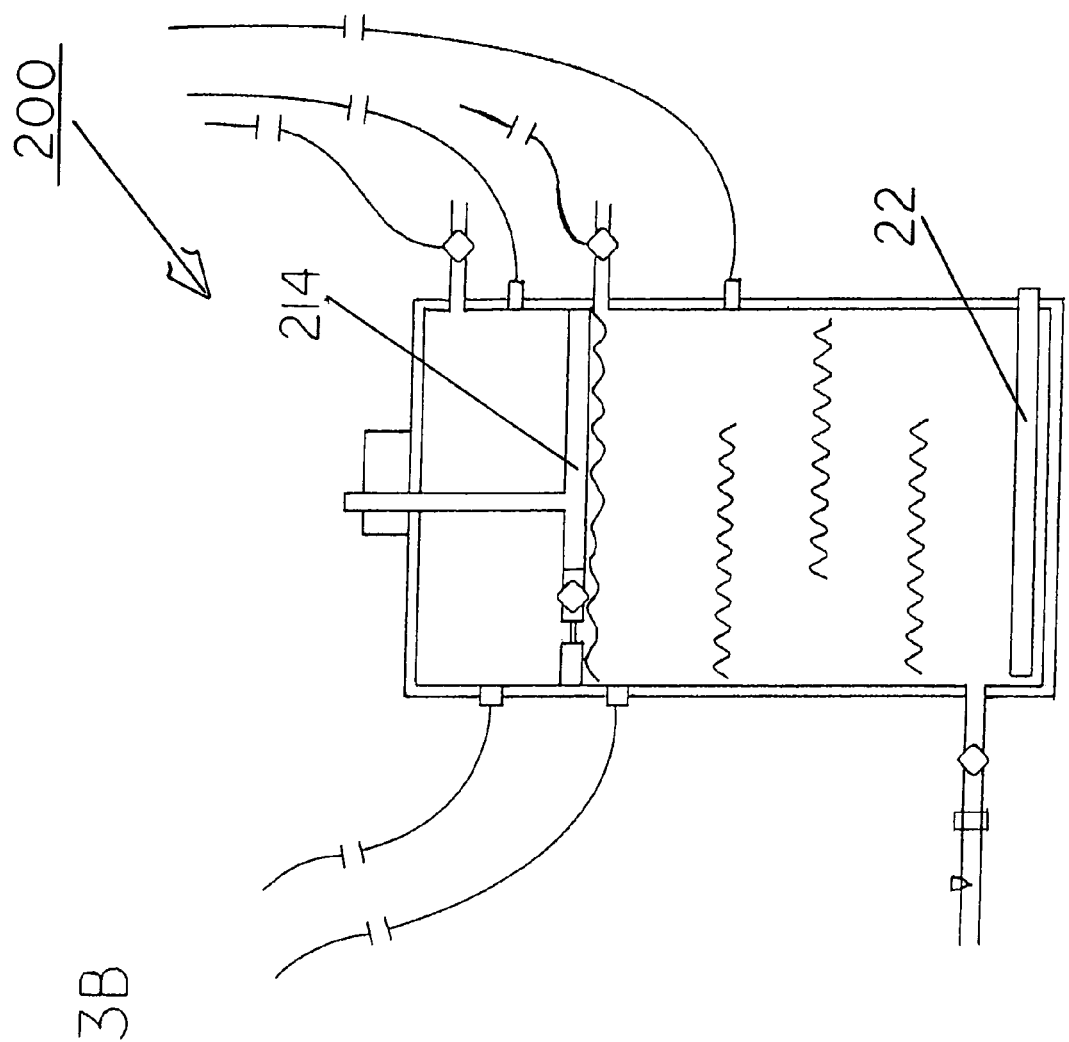
Figure 3C:
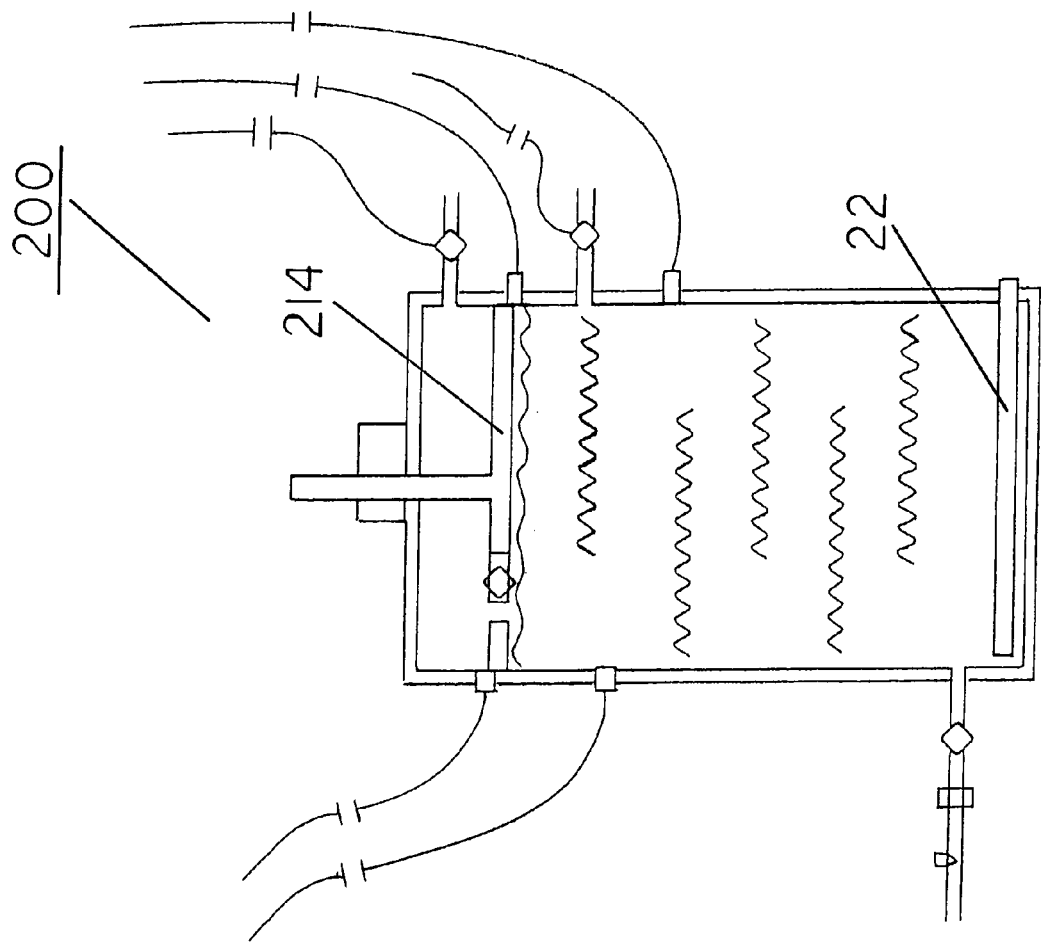

Further included and operatively coupled to the central processing unit, power supply, are a [i.] supplemental temperature sensor 104 and a [j.] flow meter 106. Reference is now made to FIGS. 2 and 2A. In this manner, while in Function 1, Mode 2, secondary temperature sensors sense the temperature of an exterior water source and correct to the appropriate temperature.

Further included, and operatively coupled to the central processing unit, power supply, are a [k.] plurality of flow control valves 204 and a volume control valve 206 and a [l.] a drive assembly 208 and a [m.] plurality of pressure level sensors 210.

The system further includes a piston 214 in the container with a drive for varying the volume of the container. Reference is now made to FIGS. 3, 3A, 3B and 3C. In this manner, while in a Function 2, Mode 1, consumption is reduced by having means to vary the amount of water in the tank during warmer periods of the year and during the periods of lower demand and heat relatively lower volume amounts of water and in cooler periods of time in a year and during the periods of time of higher demand for water relatively higher volumes of water.

Further included is a supplemental container 304 with a supplemental heating element 306 operatively associated with the supplemental container. In this manner while in a Function 2, Mode 2, there is included means by which to watch the heating varying amounts of water in a plurality of containers during warmer periods of the year with lower volumes of water being heated.

An alternate embodiment of the invention is shown in FIGS. 2 and 2A. In this embodiment, the system 100 further includes operatively coupled to the central processing unit, power supply, a [l.] supplemental temperature sensor 104 and a [j.] flow meter 106. In this manner while in Function 1, Mode 2, secondary temperature sensors sense the temperature of an exterior water source and correct to the appropriate temperature.

A further alternate embodiment of the invention is shown in FIGS. 3, 3A, 3B and 3C. In this embodiment, the system 200 further includes operatively coupled to the central processor, power supply, a [k.] plurality of flow control valves 204 and a volume control valve 206 and a [l.] drive assembly 208 and a [m.] plurality of pressure level sensors 210. The system further includes a piston 214 in the container with a drive for varying the volume of the container. In this manner, while in a Function 2, Mode 1, consumption is reduced by having means to vary the amount of water in the tank, warmer periods of the year and during the periods of lower demand and heat relatively lower volume amounts of water and heat and in cooler periods of time of a year and during period of time of higher demand for water heat a relatively higher volume of water.

Figure 4:
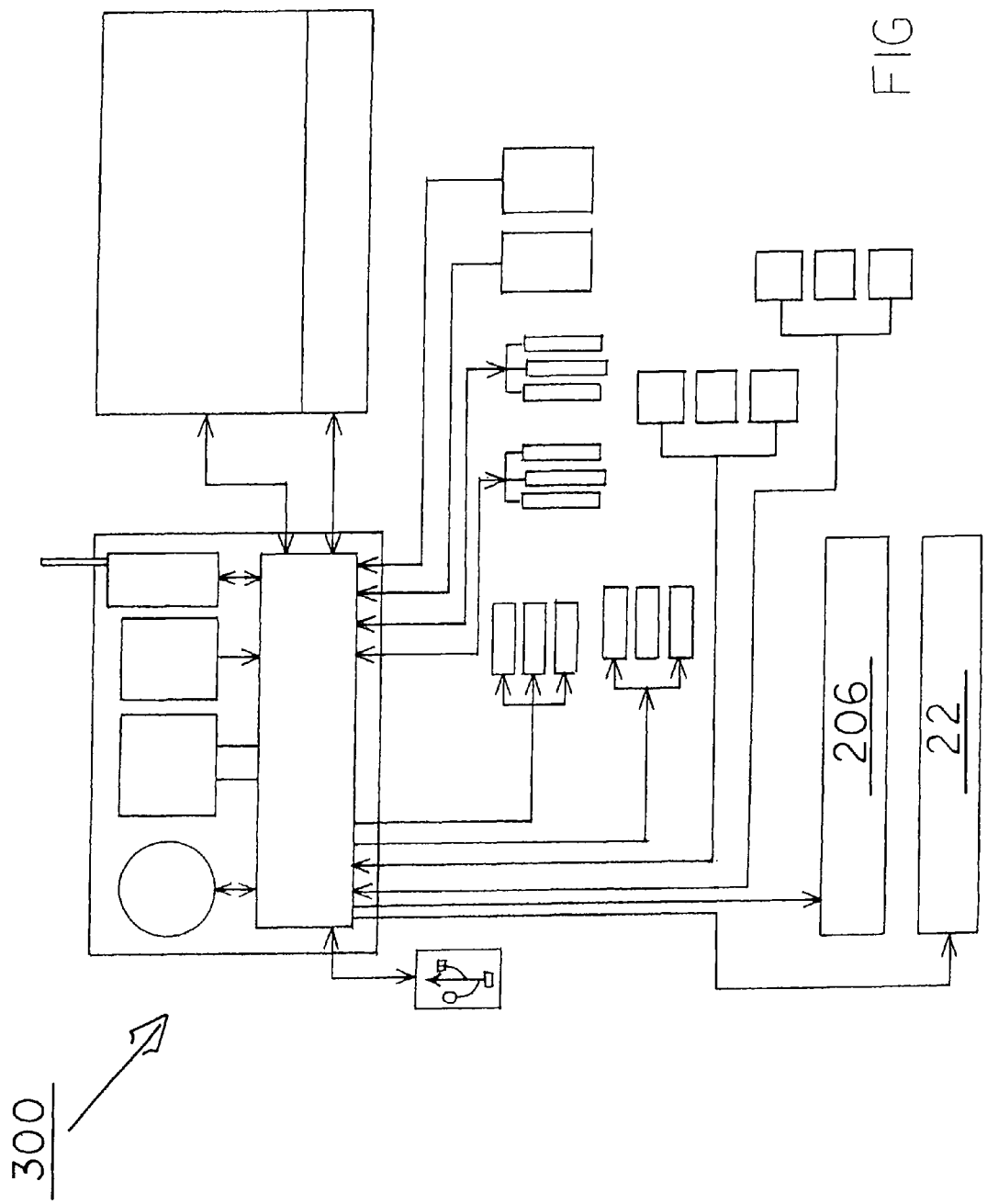
FIGS. 4, 4A, 4B and 4C are schematic and elevational views similar to the prior Figures but configured for operation in a fourth mode/function.
Figure 4A:
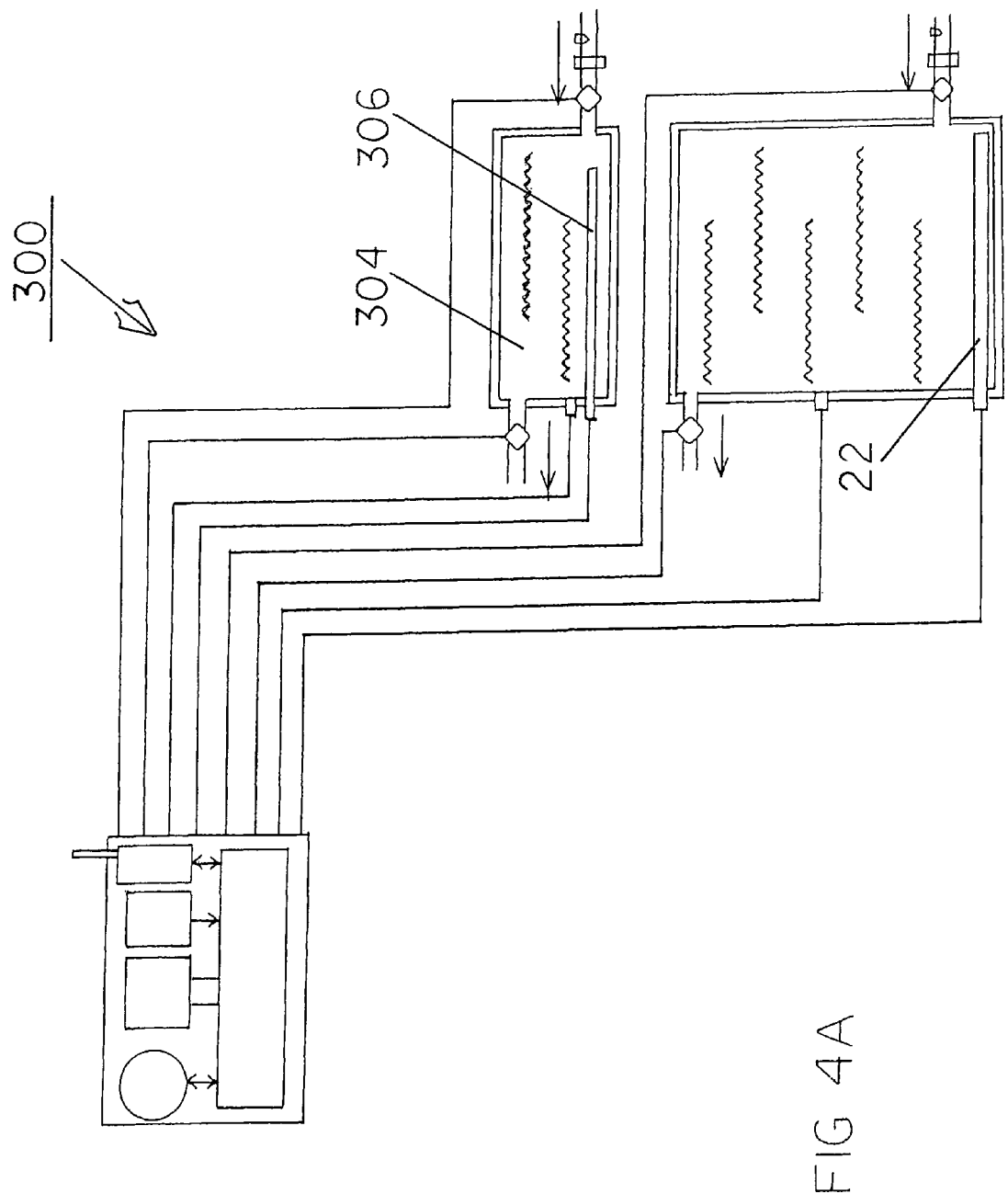
Figure 4B:
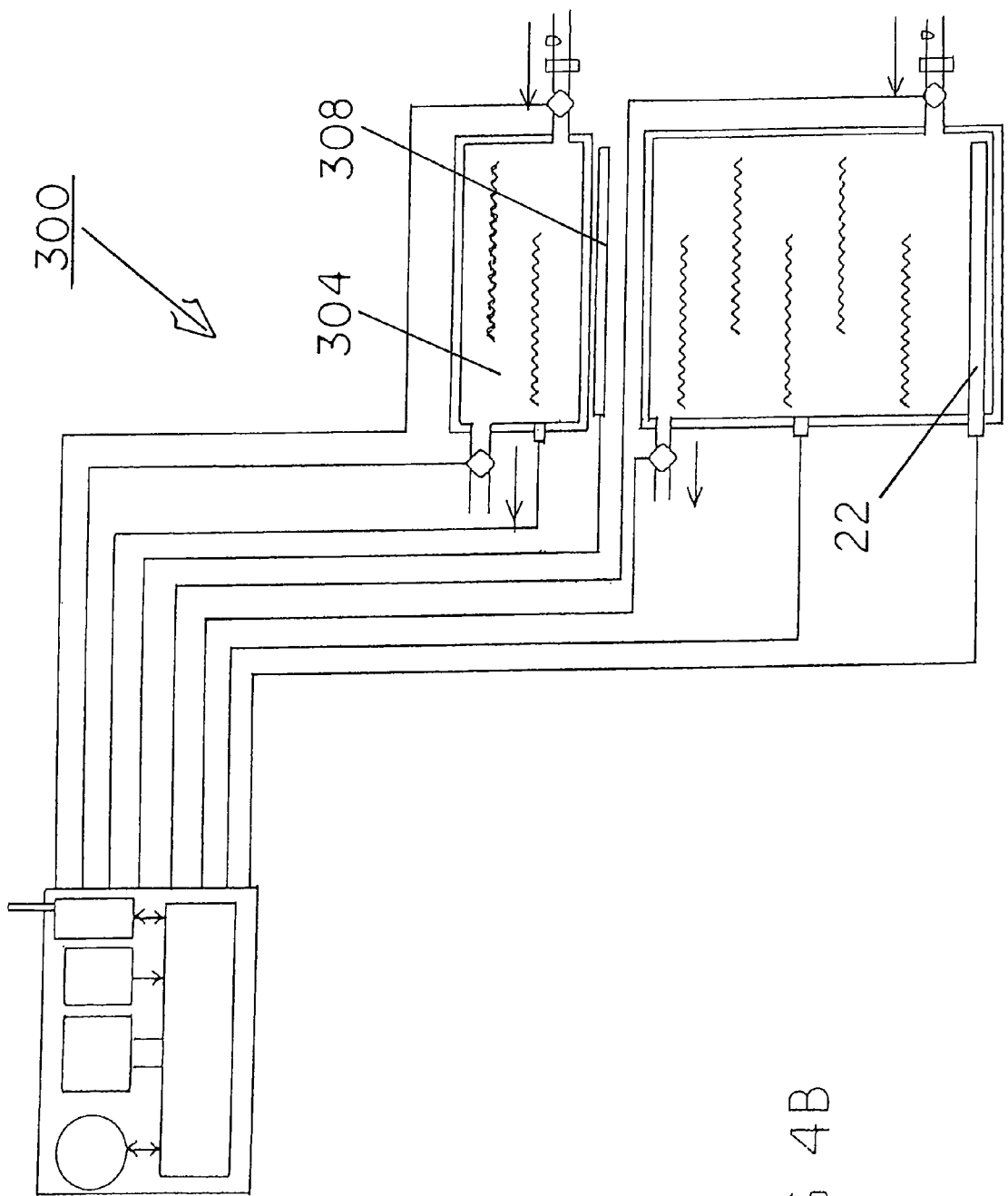
Figure 4C:
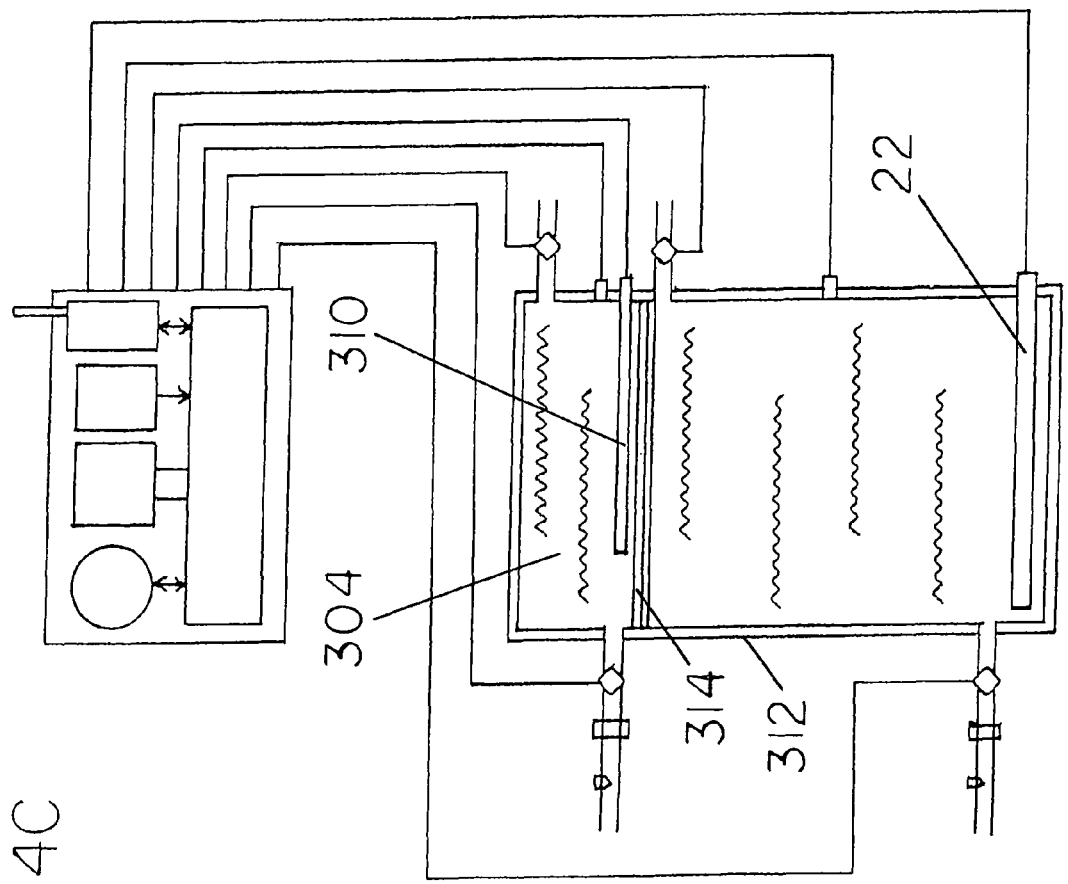

A further embodiment of the invention is Shown in FIGS. 4, 4A, 4B and 4C. In this embodiment, the system 300 further includes a supplemental container 304 with a supplemental heating element 306 operatively associated with the supplemental container. In this manner, while in a Function 2, Mode 2, there is included means by which to watch the heating varying the amounts of water in a plurality of containers during warmer periods of the year with lower volumes of water being heated. In one embodiment, the supplemental heating element 306 is in the supplemental container. In another embodiment, supplemental heating element 308 is located out of and in close proximity such as beneath the supplemental container as shown in FIG. 4B. I another embodiment, the supplemental heating element 310 is located in the supplemental container while the container and supplemental container are a common unit 312 with a wall 314 there between as shown in FIG. 4C.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A liquid heater control system (10) comprising, in combination:

- a container (14) having an inlet line (16) and an outlet line (18);
- a heating element (22) located in association with the container;
- a primary temperature sensor (24) located within the container;
- a full year clock/calendar generator component (28) for determining the temperature of liquids and continuous time of the day and time of the year at the location of the system; and
- a central processing unit and power supply (32) operatively coupled to the heating element and to the primary temperature sensor and the clock/calendar generator component, the central processing unit adapted to activate, inactivate and control the heating element as a function of data from the clock/calendar generator component and the temperature sensor;
- a secondary temperature sensor (36) and a USB port (38) and a receiver (40) operatively coupled to the central processing unit and power supply for remote control and an auxiliary power supply (42) and a memory programmer (44), the central processing unit having an associated data input means (46) and display screen (48) whereby
- the system comprise at least one functional and methodology mode chosen from the modes including a first mode, a second mode, a third mode and a fourth mode, the modes operable independently, as a part and as whole in combination with at least one other mode, and as a whole in combination with at least one other mode, the system adapted to select and regulate the temperature of water within the container and determine the amounts of water heated in a container for a period of time, the data relevant to such period of time and the temperature being programmed in the central processing unit, generally the temperature to which the water is being heated and the duration and a period of time during which the heated water is maintained at heated temperature are determined in part by the sensing, reading and recording of temperature of the external water source and data stored in the memory means of the central processing unit and by the data input by operators and the demand for hot water during periods of time, the reading and recording of temperature of the external water source being factored in the computation for data regarding amount of water heated and the temperature to which the water is being heated and the duration and a period of time during which the heated water is maintained at a heated temperature level as generally the heated water is combined with the water from an external water source,
- in the first mode, the central processing unit and the input means of this system are adapted to enable an operator of the system to select and set input a desired lower temperature setting for heating and maintaining the water at that temperature level, selected from a predetermined temperature settings during the period of time when the temperature of the external water is relatively higher, thus warmer periods of season, the system is further adapted to program temperatures settings for different seasons of a year, these values of temperature level and point to which the water is heated are in part derived from the data that is available for the climatic patters of a associated region of the world where this system is being installed and used, the first mode also adapted to enable the operator of the system to select and set to increase and decrease the temperature for the water within the container be heated to depending on the periods when there is a different demand and usage for heated hot water, in the first mode of the system is further adapted to enable the operator of this system to set and select a desired higher temperature setting to select a predetermined temperature settings during colder periods of season of the year, in the second mode, the system further includes a supplemental temperature sensor (104) and a flow meter (106) operatively coupled to the central processing unit and power supply, whereby in the second mode, secondary temperature sensors operatively coupled to the central processing unit are adapted to sense and record the temperature of the exterior water source and is further adapted to determine the appropriate temperature and to heat and maintain the water at that appropriate water temperature, and this value of the temperature being computed and determined by the programs stored in the central processing unit and by the data input by the operator, the flow meter senses the flow of the external source of water that is entering the container through the inlet and the central processing unit is programmed to record the temperature when there is a certain predetermined amount of flow of water through the inlet thus recording of accurate recording of the temperature of the external source of water and not the inaccurate reading of stagnant water in the inlet, further in the second mode, secondary temperature sensors operatively coupled to the central processing unit are adapted to sense the temperature of the exterior water source that is supplying the water heater and this also being the source of water that is combined with the heated water from the container for consumption by an operator, based on the determination of the temperature of the external water source to the central processing unit is adapted to determine and maintain the appropriate water temperature of the water in the container being heated and this value of the temperature point and range is being determined by the programs stored in the central processing unit and by the data input by the operator, in the third mode, the system further includes a plurality of flow control valves (204) and a volume control valve (206) and a drive assembly (208) and a plurality of pressure level sensors (210) operatively coupled to the central processing unit and power supply, the system further including a piston (214) in the container with a drive operatively coupled to the central processing unit, the programmer means is adapted to reposition the piston to decrease the volume of the container and positioned back to the original volume position, thus the system being adapted to vary the volume of the container whereby, in a third mode, a reduced amount of water in the tank is heated and stored at a temperatures determined by the memory means of the central processing unit, the temperature to which the water being heated and maintained is computed and determined by the programs stored in the central processing unit and by the data input by operators, thus predetermined lower volumes of water are being heated and stored during warmer periods of the year and during the periods of lower demand and further adapted to heat up to a full capacity of volume of water during cooler periods of time of a year and during high hot water demand periods of time, the fourth mode including at least one supplemental container generally of plurality of volumes (304) with supplemental heating elements (306) operatively associated with the supplemental container and valves located in association with the inlets and outlets, the valves operatively coupled with the central processing unit, the central processing unit is adapted to open and close the valves, opening and closing of the valves being computed and determined by the programs stored in the central processing unit, in the fourth mode the programs stored in the central processing unit and by the data input by operators is adapted to heat water in the at least one supplemental container, the capacity of the container and the number of containers, the sequence, the predetermined temperature to which the water is heated and the temperature at which the water is maintained, the duration and period of time the water is heated are being computed and determined by the programs stored in the central processing unit and by the data input by operators, the programmer means of the central processing unit is adapted to open the valves associated with the outlet of the containers having within the heated water to discharge the heated water contained within the container through the outlet for consumption by on operator, the valve is adapted to close when the container associate with the valve is not being used for heating water, thus the fourth mode of the system is adapted to heat and store relative lower amount of water in a fewer number of containers for heating and storing water, and the fourth more of the system is adapted to heat and store relatively lower amounts of water within a lower capacity container during warmer periods of the year during which the temperature of the external water source is higher, as the external water source which is generally combined with the heated water contained within the container before consumption is higher, wherein during the fourth mode, a reduced amount of water being heated during periods of time when there is a low usage for heated water, wherein during the fourth mode water is heated in a plurality of containers and in higher capacity containers thus higher volume of water being heated and stored during cooler periods of time of a year and during periods of time when there is a high demand for heated water.

* * * * *